United States Patent
Chae

(10) Patent No.: US 7,773,238 B2
(45) Date of Patent: Aug. 10, 2010

(54) IMAGE FORMING APPARATUS FOR REDUCING TIME OF PRINTING CONSECUTIVE PAGES OF DATA AND IMAGE FORMING METHOD THEREOF

(75) Inventor: Seok-Heon Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1343 days.

(21) Appl. No.: 11/244,146

(22) Filed: Oct. 6, 2005

(65) Prior Publication Data

US 2006/0087685 A1     Apr. 27, 2006

(30) Foreign Application Priority Data

Oct. 21, 2004   (KR) .................. 10-2004-0084219

(51) Int. Cl.
 *G06F 3/12* (2006.01)
 *H04N 1/60* (2006.01)
(52) U.S. Cl. ........................... 358/1.13; 358/1.9
(58) Field of Classification Search ............... 358/1.15, 358/1.1, 1.2, 1.3, 1.4, 1.5, 1.6, 1.7, 1.8, 1.9, 358/1.11, 1.12, 1.13, 1.14, 1.18, 1.17, 1.16, 358/3.1, 500, 501, 504, 517, 518, 519, 406, 358/407, 468; 347/2, 3, 5, 14, 23, 22, 20, 347/19; 399/9, 8, 1, 11, 10, 18, 34, 33, 35, 399/36, 50, 51, 71, 99, 100, 123, 327, 326
See application file for complete search history.

(56) References Cited

U.S. PATENT DOCUMENTS

| | | | | |
|---|---|---|---|---|
| 4,849,796 A | * | 7/1989 | Murakami | .................. 399/21 |
| 5,777,633 A | * | 7/1998 | Ejiri et al. | ..................... 347/3 |
| 5,950,036 A | * | 9/1999 | Konishi | ........................ 399/8 |
| 2002/0085235 A1 | * | 7/2002 | Degani et al. | .............. 358/3.06 |
| 2002/0140973 A1 | * | 10/2002 | Imaizumi et al. | ........... 358/1.15 |
| 2002/0159086 A1 | * | 10/2002 | Shinomiya et al. | ......... 358/1.13 |

FOREIGN PATENT DOCUMENTS

| | | |
|---|---|---|
| JP | 63-S056478 | 3/1988 |
| KR | 1997-073988 | 12/1997 |
| KR | 1998-058360 | 9/1998 |
| KR | 1999-051345 | 7/1999 |

* cited by examiner

*Primary Examiner*—Dov Popovici
(74) *Attorney, Agent, or Firm*—Roylance, Abrams, Berdo & Goodman, L.L.P.

(57) ABSTRACT

An image forming apparatus to reduce time required for printing consecutive pages of printing data and an image forming method thereof. The apparatus includes a data processing unit for performing a pre-printing process of received printing data in single page units. A printing unit for printing a first page and performing an after-printing process when there is not a second page or when the pre-printing process of the second page is not complete. A controlling unit for controlling the printing unit to end the after-printing process for the first page when the pre-printing process of the second page is complete.

13 Claims, 3 Drawing Sheets

IMAGE FORMING APPARATUS FOR REDUCING TIME OF PRINTING CONSECUTIVE PAGES OF DATA AND IMAGE FORMING METHOD THEREOF

CROSS-REFERENCE TO RELATED APPLICATIONS

This application claims the benefit under 35 U.S.C. §119 (a) of Korean Patent Application No. 2004-84219, filed on Oct. 21, 2004, the entire disclosure of which is hereby incorporated by reference.

BACKGROUND OF THE INVENTION

1. Field of the Invention

The present invention relates to an image forming apparatus to reduce the time necessary for printing consecutive pages of printing data and an image forming method thereof. More particularly, the present invention relates to an image forming apparatus configured to generate a command to print a following page of printing data while performing an after-printing process.

2. Description of the Related Art

An image forming apparatus generates printing data or receives printing data from an external device. The image forming apparatus prints the printing data on a sheet of printing paper. Generally, the image forming apparatus includes copiers, faxes, printers or multifunction peripherals (MFP) having functions of scanning, printing, copying and faxing.

The image forming apparatus performs various pre-printing processes for printing the printing data onto the sheet of printing paper. For example, the image forming apparatus receives digital type printing data from the external device and converts the digital type printing data to analog data. The printing data may include a plurality of pages for consecutive printing. The image forming apparatus performs the pre-printing processes in single page units of printing data. That is, first, the image forming apparatus performs the pre-printing processes on a first page. Then, the image forming apparatus performs the pre-printing process on consecutive pages of the printing data. After completing the pre-printing processes of the first page, the image forming apparatus generates a printing command to print the pre-printing process for the first page. After printing the pre-printing processed first page, the image forming apparatus performs a pre-printing process for the second page, which follows the first page.

In case of a plurality of pages having printing data, each page may contain different amounts of data for processing. The time required for performing the pre-printing process increases with respect to the amount of data contained on each page of the printing data.

After performing a pre-printing process on one page of the printing data, the image forming apparatus prints the processed page onto a sheet of printing paper. While printing the first pre-printing processed page, the image forming apparatus performs a pre-printing process on a following page of printing data.

If the pre-printing process of the following page is unable to complete, the image forming apparatus does not generate a printing command for printing the next page, even though the previous page is completely printed and there is still printing data which remains to be printed.

If the printing command is not generated, the image forming apparatus still completes the printing operation to form an image on a sheet of printing paper and pushes out the sheet. Simultaneously, the image forming apparatus performs an after-printing process.

The after-printing process is a process which prepares a following page to print the printing data.

A drawback of the conventional image forming apparatus is that it does not determine whether a printing command of the following page is generated during performance of the after-printing process.

The conventional image forming apparatus determines whether the printing command for printing the following page is generated after completing the after-printing process. And then, the image forming apparatus prints the following page when it is determined that the printing command of the following page is generated.

Accordingly, the conventional image forming apparatus must wait for completing the after-printing process to determine whether the printing command to print the following page is generated. More particularly, if the printing data includes a comparatively large number of pages, the conventional image forming apparatus must spend a significant amount of time waiting until the after-printing process is completed to determine whether the printing command of the following page is generated. Therefore, the conventional image forming apparatus takes a comparatively longer time for printing consecutive pages of printing data. Therefore, performance of the conventional image forming apparatus is degraded.

Accordingly, there is a need for an improved image forming apparatus for determining printing commands during the after-printing process to improve performance.

SUMMARY OF THE INVENTION

An aspect of the present invention is to solve at least the above problems and/or disadvantages and to provide at least the advantages described below. Accordingly, an aspect of the present invention is to provide an image forming apparatus for reducing the time required for printing consecutive pages of printing data and an image forming method thereof.

In accordance with an aspect of the present invention, there is provided an image forming apparatus including a data processing unit to perform a pre-printing process for received printing data of consecutive pages in single page units. A printing unit to perform a printing operation for printing a first page which has completed the pre-printing process and performing an after-printing process for the received printing data on the first page before the pre-printing process for the second page is complete. A controlling unit controls the printing unit to end the after-printing process of the first page when the pre-printing process of the second printing page is complete. The controlling unit controls the print unit to print the pre-printing process second page on the printing paper.

The image forming apparatus may further include a sensing unit to detect completion of a printing operation of the first page of the received printing data.

The sensing unit may be a printing paper supplying sensor.

The after-printing process may a control voltage of at least one of a charging voltage, a developing voltage, a transferring voltage and a cleaning voltage.

The after-printing process may be at least one of a cleaning process, a density correcting process and a color matching calibration process.

The pre-printing process may convert the received printing data to data having a printable format in single page units.

In accordance with another aspect of the present invention, there is provided an image forming method including the steps of: a) performing a pre-printing process for receiving printing data from consecutive pages in single page units; b) printing a second page among the consecutive pages of the printing data after the pre-printing process of the first page is complete; c) performing an after-printing process when the received printing data does not include a second page or when the pre-printing process of the second page is not complete d) ending the after-printing process of the first page when the pre-printing process of the second page is complete; and e) printing the pre-printing processed second page on the printing paper.

The image forming method may further include the step of f) detecting completion of printing the first page.

The after-printing process may control a voltage of at least one of a charging voltage, a developing voltage, a transferring voltage and a cleaning voltage.

The after-printing process may be at least one of a cleaning process, a density correcting process and a color matching calibration process.

The pre-printing process may convert the received printing data to data having a printable format in single page units.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, and features, and advantages of certain embodiments of the present invention will be more apparent from the following description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
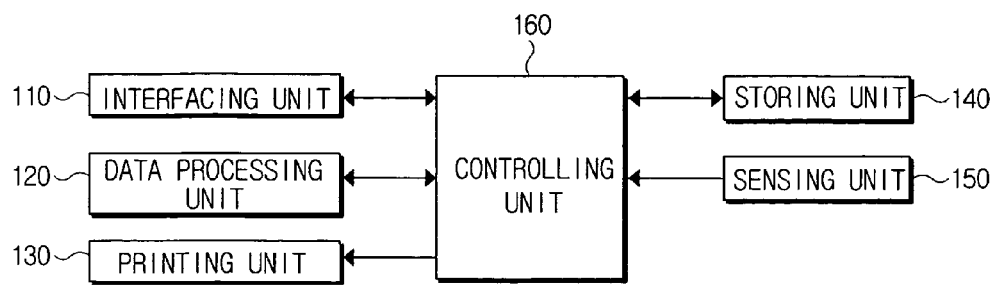
FIG. 1 is a block diagram illustrating an image forming apparatus in accordance with an embodiment of the present invention.

FIG. 1 is a diagram illustrating an image forming apparatus in accordance with an embodiment of the present invention.

As shown in FIG. 1, the image forming apparatus includes an interfacing unit 110, a data processing unit 120, a printing unit 130, a storing unit 140, a sensing unit 150 and a controlling unit 160.

The interfacing unit 110 receives printing data from consecutive pages of an external device.

The data processing unit 120 performs a pre-printing process of the received printing data in single page units for printing the consecutive pages of received printing data. That is, the digital type of the received printing data is converted to analog type data by performing the pre-printing process.

The printing unit 130 receives the pre-printing processed page among the consecutive pages included in the received printing data from the data processing unit and prints the pre-printing processed page onto a sheet of printing paper. That is, the printing unit 130 forms a toner image of the pre-printing processed page for printing the formed toner image.

After printing the pre-printing processed page of the printing data, the printing unit 130 performs an after-printing process.

The after-printing process is a process for preparing to print the next page of printing data. The after-printing process is a cleaning process for a black/white image forming apparatus. Also, the after-printing process may be a density correcting process. Moreover, the after-printing process may be a color matching calibration process.

The cleaning process eliminates toner that remains on surfaces of a photoconductive drum 131 or a development roller 136. The cleaning process is performed by the printing unit 130 after completing the printing operation.

The density correcting process constantly maintains a density of color or a density of black/white after completing forming images. The printing unit 130 performs the density correcting process after completing the printing operation.

The color matching calibration process calibrates a location of a color matching for generating non-existent color by using colors provided from the image forming apparatus. The printing unit 130 performs the color matching calibration process after completing the printing operation.

Hereinafter, the printing process performed by the printing unit 130 and the after-printing process are explained in detail by referring to FIGS. 2 and 3.

Figure 2:
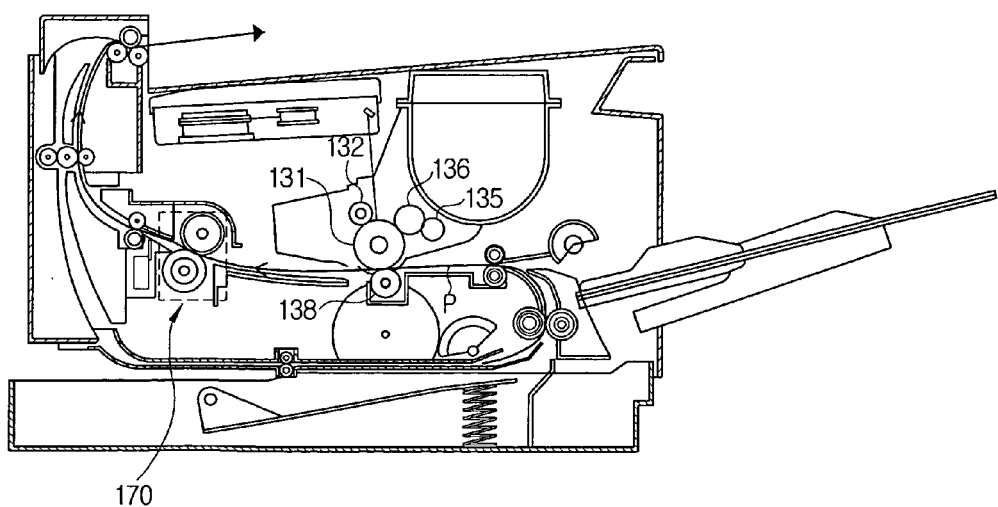
FIG. 2 is a detailed diagram showing an internal structure of the image forming apparatus of FIG. 1 in accordance with an embodiment of the present invention.

FIG. 2 is a detailed diagram showing an internal structure of the image forming apparatus of FIG. 1. FIG. 3 is a detailed diagram depicting the printing unit 130 of the image forming apparatus in FIG. 1.

Figure 3:
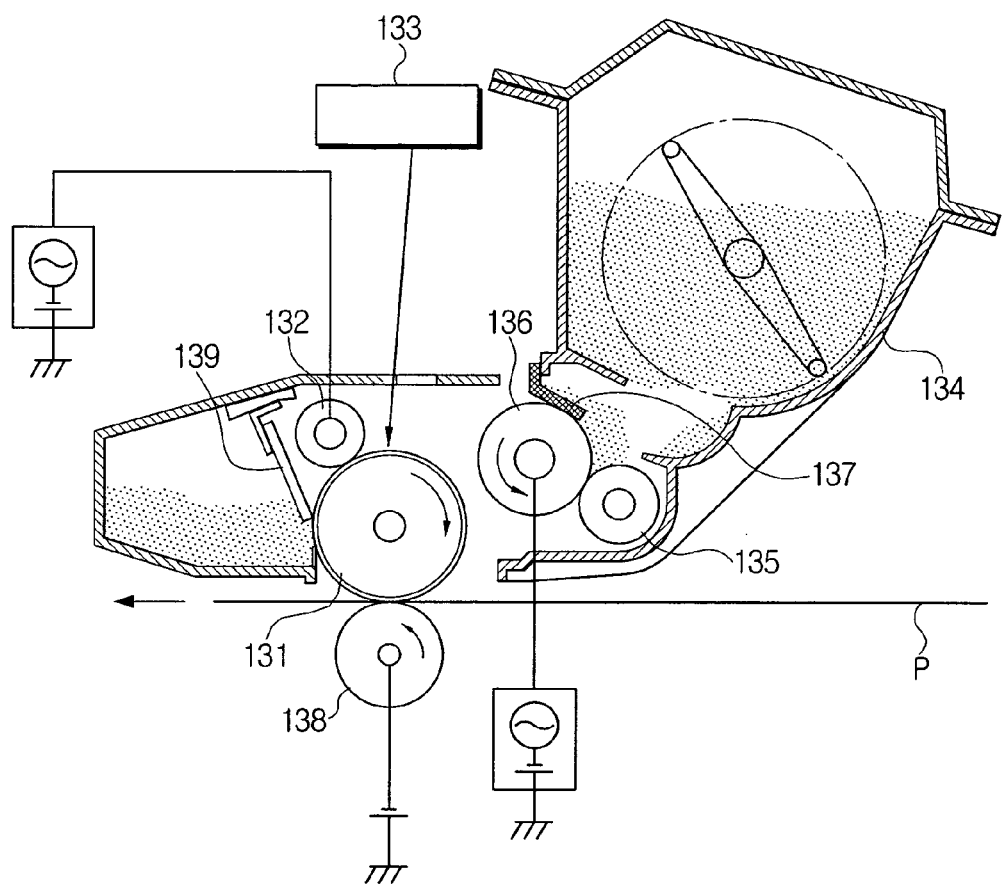
FIG. 3 is a detailed diagram depicting the printing unit of the image forming apparatus in FIG. 1.

By referring to FIGS. 2 and 3, the printing unit 130 includes the photoconductive drum 131, a charge roller 132, an optical scanning device 133, a toner case 134, an application roller 135, a development roller 136, a regulating blade 137, a transfer roller 138 and a cleaning blade 139.

For printing a page having printing data onto printing paper P, the charge roller 132 charges a predetermined area of a surface of the photoconductive drum 131. The optical scanning device 133 forms an electrostatic latent image on the charged area of the photoconductive drum 131. The application roller 135 applies toner from the toner case 134 to the development roller 136. The applied toner is transferred to the charged area of the photoconductive drum 131 by the regulating blade 137. Accordingly, the electrostatic latent image is converted to a toner image. Printing paper P is supplied to the image forming apparatus and the applied printing paper P travels between the photoconductive drum 131 and the transferring roller 138. During travel, the toner image is transferred to the printing paper P to form the image on the printing paper P.

The printing paper with image formed thereon travels to a toner image fixing unit 170. The toner image fixing unit 170 fuses and fixes the image onto the sheet of paper by applying high temperature and compression.

After traveling through the fixing unit, the printing unit 130 performs the after-printing process.

During the after-printing process, the cleaning process is performed. After forming the image on the printing paper with toner, toner remaining on the surface of the photoconductive drum 131 and the development roller 136 must be eliminated to prevent the formation of overlapped images on the printing paper. The cleaning process reduces or eliminates toner remaining on the surface of the photoconductive drum 131 and the development roller 136.

Un-transferred toner remains on the surface of the photoconductive drum 131 after printing images onto the printing paper. Additionally, the un-transferred toner and un-developed toner remain on the surface of the development roller 136. The un-transferred toner is cleaned by the cleaning blade 139 and the un-developed toner is collected by the application roller 135. The application roller 135 contacts the development roller 136.

On average, the image forming apparatus spends three to four seconds performing the cleaning process.

The density correcting process constantly maintains density of color or a density of black/white. The printing unit 130 performs the density correcting process after completing the printing operation. That is, a visible image is developed on the photoconductive drum 131 and the printing unit 130 corrects an area of the visible image having inconsistent color or black/white tone to have consistent tone.

The color matching calibration process calibrates a location of color matching to generate a non-existent color by using color applied by the image forming apparatus. The printing unit 130 performs the color matching calibration process to prevent visible images from scattering or becoming distorted. The printing unit 130 develops the visible image on the surface of the photoconductive drum 131 after image formation onto the printing paper. Then, printing unit 130 calibrates color matching location where inconsistencies are located.

Referring to FIG. 1, a method for reducing time required for printing consecutive pages of printing data based on the control of the controlling unit 160 will be explained in further detail.

The storing unit 140 stores the received printing data from the interfacing unit 110.

The sensing unit 150 senses the printing paper P that travels through a printing paper traveling path and generates a signal by analyzing the traveling path to the controller unit 160. That is, the sensing unit 150 is a printing paper supplying sensor for detecting a point of time when the printing paper is pushed out of the image forming apparatus. The sensing unit 150 senses the printing paper traveling through the printing paper traveling path. By detecting the point of time when the printing paper is pushed out, the sensing unit 150 detects completion of printed images on the printing paper.

The controlling unit 160 determines whether printing data for a plurality of consecutive sheets of paper is received or not. If the controlling unit 160 determines that the printing data is received, the controlling unit 160 controls the data processing unit 120 to perform the pre-printing process of the received printing data in a single page unit of printing data. After completing the pre-printing process for a first sheet of paper from among the consecutive pages, the controlling unit 160 generates a printing command to print the pre-printing processed page.

When the controlling unit 160 generates the printing command, the controlling unit 160 controls the printing unit 130 to perform the printing operation for printing the first page. While performing the printing operation of the first page, the controlling unit controls the data processing unit 120 to perform a pre-printing process for a second page following the first page.

If the controlling unit 160 detects that the printing paper P is pushed out of the image forming apparatus when the printing command of the second page is not generated, the controlling unit 160 determines that the printing operation of the first page is complete and the controlling unit 160 performs the after-printing process on the second page by controlling the printing unit 130.

The controlling unit 160 determines whether pre-printing process of the second page is complete while performing the after-printing process. If the pre-printing process of the second page is complete, the controlling unit 160 generates the printing command for printing the second page of printing data onto the printing paper.

If the printing command of the second page is generated, the controlling unit 160 controls the printing unit 130 to terminate the after-printing process and then analyzes an internal environment of the image forming apparatus. If the controlling unit 160 recognizes that the internal environment is different from an initial environment of the image forming apparatus, the controlling unit 160 re-sets the image forming apparatus to have the initial environment.

Next, if the controlling unit 160 generates the printing command while performing the after-printing process, the controlling unit 160 controls voltage of the printing unit 130 to end the after-printing process and re-performs the printing operation.

Figure 4:
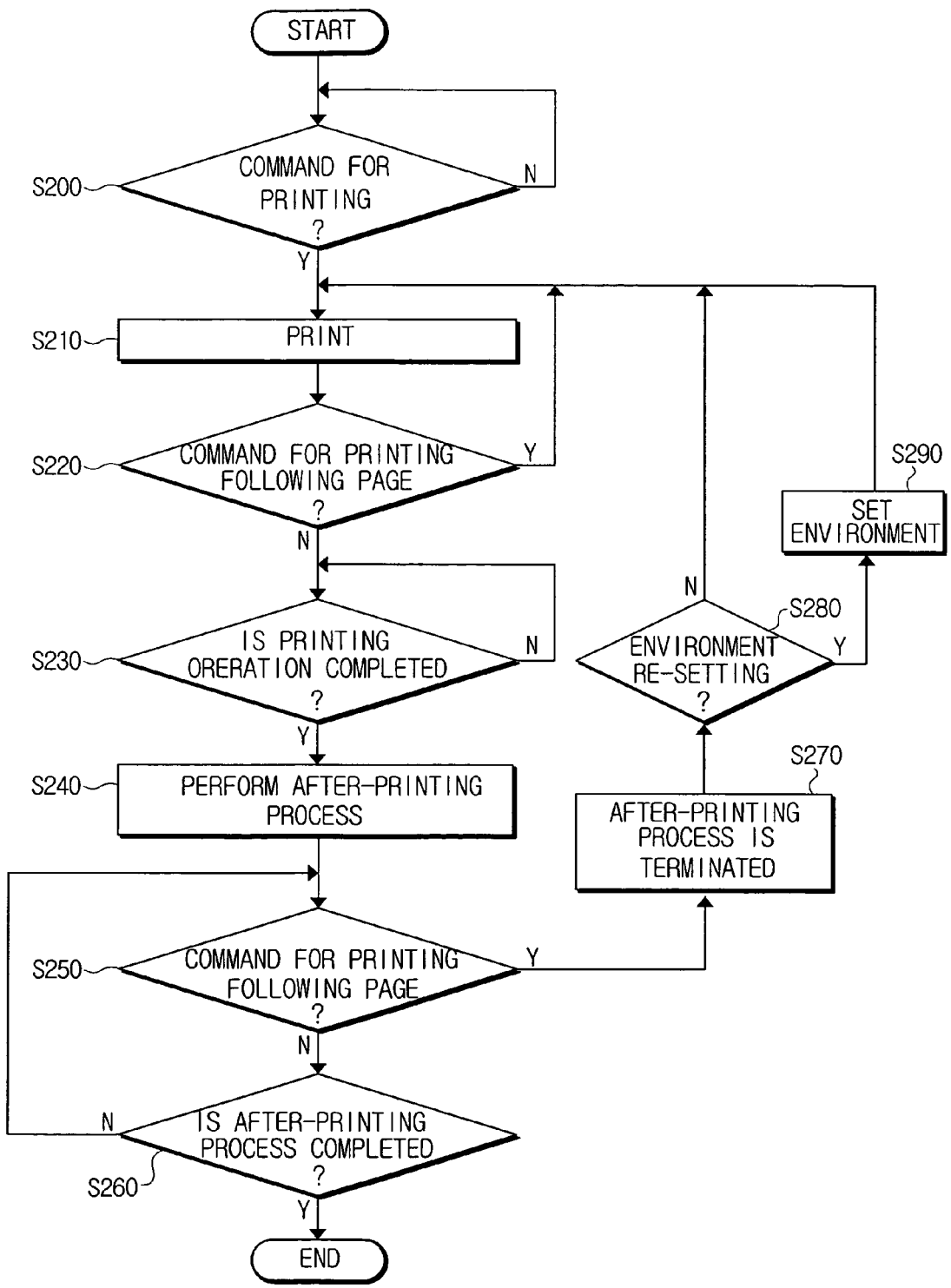
FIG. 4 is a flowchart of an image forming method in accordance with an embodiment of the present invention.

FIG. 4 is a flowchart of an image forming method to reduce time for printing consecutive pages of printing data in accordance with an embodiment of the present invention.

As shown in FIG. 4, the controlling unit 160 determines whether the printing command is generated or not at step S200. When the image forming apparatus receives the printing data and the received printing data includes a plurality of consecutive pages, the controlling unit 160 performs the pre-printing process in single page units. The pre-printing process converts the digital type printing data to an analog type of data.

That is, the controlling unit 160 performs the pre-printing process of a first page of a plurality of consecutive pages having printing data. After completing the pre-printing process of the first page, the pre-printing processed first page is printed by generating a printing command. During the printing of the pre-printing processed first page, a second page of the printing data is pre-printing processed, wherein the second page is the next page among the consecutive pages included in the printing data. The time for performing the pre-printing process differs according to an amount of printing data contained on each page. For example, typically, the more printing data an individual page contains, the longer time it takes to perform the pre-printing process.

As mentioned above, the controlling unit 160 generates the printing command when the pre-printing process of the first page is completed.

When the printing command is generated, the controlling unit 160 controls the printing unit 130 to print the pre-printing processed page on the printing paper at step S210.

After generating the printing command of the pre-printing processed first page, the controlling unit 160 determines whether the controlling unit 160 generates the printing command for printing a second page. The second page is next to the printed page among the consecutive pages included in the printing data during printing the pre-printing processed page at step S220. If the pre-printing process of the following page is not complete, the printing command is not generated even though there is printing data remaining for printing.

If the printing command for following page is not generated, the controlling unit 160 determines whether the printing operation is completed at step S230. If the sensing unit 150 detects that the printing paper has been pushed out of the image forming apparatus, the controlling unit 160 determines that the printing operation of corresponding page is complete.

If the sensing unit 150 detects completion of the printing operation, the controlling unit 160 controls the printing unit 130 to perform the after-printing process at step S240. The after-printing process is a process for preparing to print the second or following page of printing data.

The after-printing process includes a density correcting process, a color matching calibration process and a cleaning process.

The density correcting process constantly maintains a density of color or a density of black/white tone and the printing unit 130 performs the density correcting process after completing the printing operation.

The color matching calibration process calibrates a location of color matching for generating a non-existent color by using colors provided from the image forming apparatus. The printing unit 130 performs the color matching calibration process after completing the printing operation.

The cleaning process eliminates toner remaining on a surface of the photoconductive drum 131 and the development roller 136 after completing the printing operation. The printing unit 130 performs the cleaning operation after completing the printing operation.

During performing the after-printing process, the controlling unit 160 determines whether the printing command of the second or following page is generated at step S250. If the pre-printing process of the second or following page is completed, the controlling unit 160 generates the printing command for printing the second or following page.

If there is no printing command generated, the controlling unit 160 determines whether the after-printing process is completed at step S260. For example if the controlling unit 160 determines that a time T for performing the cleaning process exceeds a predetermined cleaning time Tc, the controlling unit 160 recognizes the after-printing process is complete and terminates the cleaning process.

Until the after-printing process is complete, the controlling unit 160 continuously determines whether the pre-printing process of the following page is complete.

If the controlling unit 160 generates the printing command by determining that the pre-printing processed page of printing data existed at step S250, the controlling unit 160 controls the printing unit 130 to terminate the after-printing operation at step S270.

When the after-printing process is complete, the controlling unit 160 determines whether there is variation of the internal environment of the image forming apparatus at step S280. The image forming apparatus maintains a constant internal environment by maintaining an internal temperature within a constant range for performing the printing operation and a fixing temperature for fixing the printing data onto the printing paper.

If the internal environment is varied, the controlling unit 160 sets the image forming apparatus to have an initial environment at step S290. After completing the setting of the internal environment, the controlling unit 160 terminates the after-printing process by controlling voltage of the printing unit 130 and re-performs the printing operation.

The voltage of printing unit 130 performing the after-printing process is lower than the voltage of the printing unit 130 performing the printing operation. Accordingly, the controlling unit 160 increases the voltage of the printing unit 130 for terminating the after-printing process and then the printing unit 130 performs the printing operation.

In the embodiment of the present invention, the cleaning blade 139 is used for the cleaning process. However, a cleaning roller may be used as the cleaning blade 139. Also, the cleaning roller may be used with the cleaning blade 139 for performing the cleaning process.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image forming apparatus, comprising:
   a data processing unit for performing a pre-printing process of a received printing data including consecutive pages in one-page units;
   a printing unit for performing a printing operation for printing a first printing data that has at least one pre-printing processed page among the consecutive pages included in the received printing data and performing an after-printing process when the received printing data does not include a second printing data that is subsequent to the first printing data and has at least one page, or when the pre-printing process of the second printing data is not completed until the printing operation of the first printing data is completed; and
   a controlling unit for controlling the printing unit to end the after-printing process when the pre-printing process of the second printing data is completed during performing the after-printing process and controlling the printing unit to print the second printing data, for which the pre-printing process is completed.

2. The image forming apparatus of claim 1, further comprising a sensing unit for detecting completion of the printing operation of the first printing data of the received printing data.

3. The image forming apparatus of claim 2, wherein the sensing unit is a printing paper supplying sensor.

4. The image forming apparatus of claim 2, wherein the after-printing process controls a voltage of at least one of a charging voltage, a developing voltage, a transferring voltage and a cleaning voltage.

5. The image forming apparatus of claim 1, wherein the after-printing process is at least one of a cleaning process, a density correcting process and a color matching calibration process.

6. The image forming apparatus of claim 1, wherein the pre-printing process converts the received printing data to data having a printable format in one-page units.

7. The image forming apparatus of claim 1, wherein the pre-printing process comprises a process performed before printing an image in which toner is formed on a paper.

8. An image forming method, comprising the steps of:
   a) performing a pre-printing process of received printing data including consecutive pages in one-page units;
   b) printing a first printing data that has at least one pre-printing processed page among the consecutive pages included in the received printing data;
   c) performing an after-printing process when the received printing data does not include a second printing data that is subsequent to the first printing data and has at least one page, or performing the after-printing process when the pre-printing process of the second printing data is not completed until the printing of the first printing data is completed;

d) ending the after-printing process when the pre-printing process of the second printing data is completed during performing of the after-printing process; and e) printing the second printing data for which the pre-printing process is complete.

9. The image forming method of claim 8, further comprising the step of f) detecting completion of printing of the first printing data.

10. The image forming method of claim 8, wherein the after-printing process controls a voltage of at least one of a charging voltage, a developing voltage, a transferring voltage and a cleaning voltage.

11. The image forming method of claim 8, wherein the after-printing process is at least one of a cleaning process, a density correcting process and a color matching calibration process.

12. The image forming method of claim 8, wherein the pre-printing process converts the received printing data to data having a printable format in one-page units.

13. The image forming method of claim 8, wherein the pre-printing process comprises a process performed before printing an image in which toner is formed on a paper.

* * * * *